(12) United States Patent
Wang et al.

(10) Patent No.: US 8,080,308 B2
(45) Date of Patent: *Dec. 20, 2011

(54) ONE-PART MOISTURE CURABLE HOT MELT SILANE FUNCTIONAL POLY-ALPHA-OLEFIN SEALANT COMPOSITION

(75) Inventors: Bing Wang, Woodbury, MN (US); John E. Greenzweig, Minneapolis, MN (US)

(73) Assignee: H.B. Fuller Company, St. Paul, MN (US)

( * ) Notice: Subject to any disclaimer, the term of this patent is extended or adjusted under 35 U.S.C. 154(b) by 2030 days.

This patent is subject to a terminal disclaimer.

(21) Appl. No.: 10/385,834

(22) Filed: Mar. 11, 2003

(65) Prior Publication Data

US 2004/0180154 A1 Sep. 16, 2004

(51) Int. Cl.
*B32B 7/02* (2006.01)
(52) U.S. Cl. ............ 428/212; 428/34; 525/191; 525/72; 525/326.5; 525/288
(58) Field of Classification Search ............... 428/34, 428/212; 525/191, 72, 326.5, 288, 106, 100, 525/105, 209, 232, 222, 240
See application file for complete search history.

(56) References Cited

U.S. PATENT DOCUMENTS

| | | | |
|---|---|---|---|
| 5,264,515 A * | 11/1993 | Cody et al. ............ | 528/10 |
| 5,436,040 A | 7/1995 | Lafond ............... | 428/34 |
| 5,632,122 A | 5/1997 | Spinks ............... | 52/172 |
| 5,849,832 A | 12/1998 | Virnelson et al. ........ | 524/512 |
| 5,855,972 A * | 1/1999 | Kaeding .............. | 428/34 |
| 5,994,474 A * | 11/1999 | Wey et al. ............ | 525/288 |
| 6,121,354 A | 9/2000 | Chronister ............ | 524/262 |
| 6,235,848 B1 | 5/2001 | Bickert et al. .......... | 525/326.5 |
| 6,245,145 B1 | 6/2001 | Lisec | |
| 6,281,288 B1 | 8/2001 | Bickert et al. .......... | 525/72 |
| 6,286,288 B1 | 9/2001 | France | |
| 6,319,990 B1 * | 11/2001 | Spence et al. .......... | 525/209 |
| 6,455,637 B1 | 9/2002 | Jackson et al. ......... | 525/191 |
| 6,682,818 B2 * | 1/2004 | Czaplicki et al. ........ | 428/413 |
| 6,706,813 B2 * | 3/2004 | Chiba et al. ........... | 525/95 |
| 6,846,893 B1 * | 1/2005 | Sherman et al. ........ | 528/28 |
| 6,866,928 B2 * | 3/2005 | Narum et al. .......... | 428/354 |
| 7,176,269 B2 * | 2/2007 | Hakuta et al. ......... | 528/34 |
| 2002/0072561 A1 | 6/2002 | Johoji et al. | |
| 2004/0059069 A1 | 3/2004 | Grimm et al. | |

FOREIGN PATENT DOCUMENTS

| | | |
|---|---|---|
| CA | 2258585 | 1/2003 |
| DE | 196 24 236 A1 | 1/1998 |
| DE | 198 21 355 A1 | 11/1999 |
| EP | 0 852 280 B1 | 7/1998 |
| EP | 1 052 362 A2 | 11/2000 |
| JP | 1-163255 | 6/1989 |
| JP | 4-159371 | 6/1992 |
| JP | 5-179217 | 7/1993 |
| JP | 2001-354949 | 12/2001 |
| WO | WO 89 / 11513 A1 | 11/1989 |
| WO | WO 91 / 06580 | 5/1991 |
| WO | WO 00 / 47687 A1 | 8/2000 |

* cited by examiner

*Primary Examiner* — David Sample
*Assistant Examiner* — Lawrence Ferguson
(74) *Attorney, Agent, or Firm* — Allison Johnson; Kirsten Stone

(57) ABSTRACT

Disclosed is a moisture curable sealant composition that includes silane functional poly-α-olefin polymer, thermoplastic elastomer, and tackifying agent.

8 Claims, No Drawings

ONE-PART MOISTURE CURABLE HOT MELT SILANE FUNCTIONAL POLY-ALPHA-OLEFIN SEALANT COMPOSITION

BACKGROUND

The invention relates to moisture curing sealant compositions that include silane functional poly-α-olefins.

Insulating glass assemblies such as insulating glass units and insulating sash assemblies often include a pair of glass sheets maintained in a fixed spaced relation to each other by a spacing and sealing composition that extends around the periphery of the inner facing surfaces of the glass sheets to define a sealed and insulating space between the glass sheets. In the case of insulating sash assemblies, the glass panes are adhered to a frame. The glass sheets are usually attached to the structure by a sealant or adhesive composition. The sealant or adhesive composition is also used to seal the edges of the insulating glass assembly so as to establish a barrier that prevents moisture from penetrating into the interior of the assembly. Insulating sash assemblies are described, e.g., in U.S. Pat. No. 6,286,288.

Sealants used in glass assemblies are referred to as "primary" sealants and "secondary" sealants. Primary sealants provide a moisture barrier function between the two substrates of the assembly. Secondary sealants provide an adhesive bond between two substrates in the assembly. Some sealants are formulated to provide both primary and secondary sealant functions.

Two classes of sealants used in the insulating glass industry are chemically curing thermoset compositions, and thermoplastic one-part hot melt butyl-type compositions. Chemically curing systems often include liquid polysulphides, polyurethanes, mercaptan-modified polyether polyurethanes and two-component silicones. Thermoplastic compositions, which are also referred to as "non-curing systems," are often polyisobutylene-polyisoprene copolymer rubber-based hot melt compositions.

Chemical curing thermoset sealants are usually two-component systems in which the components are combined, at room temperature, just prior to application. The sealants tend to cure slowly. The slow cure can increase manufacturing time and costs.

Non-curing hot melt systems generally set faster and can overcome the disadvantage of having a slow cure time, but hot melts are more susceptible to fluctuations in ambient temperature and may soften with high temperatures or stiffen with cold and do not develop as high ultimate bond strengths in comparison to curing systems.

Other sealant compositions that have been developed include a one part sealant that includes thermoplastic hot melt resin and an atmosphere curing resin capable of polymerizing upon exposure to ambient atmosphere. Some of these compositions cure to such a hardness that, when used as a sealant in a window construction, they create a tension between two substrates when the substrates are of differing materials, e.g., glass and polymer.

SUMMARY

The invention features a moisture curable sealant composition that includes silane functional poly-α-olefin polymer, thermoplastic elastomer, and tackifying agent. In one embodiment, the sealant composition includes at least 10% by weight the thermoplastic elastomer. In some embodiments, the thermoplastic elastomer is selected from the group consisting of butyl rubber, polyisobutylene and combinations thereof. In other embodiments, from about 5% by weight to about 80% by weight silane functional amorphous poly-α-olefin polymer, from at least 10% by weight to about 75% by weight thermoplastic elastomer, and from at least 5% by weight to about 60% by weight tackifying agent. In some embodiments, the sealant composition includes at least 15% by weight tackifying agent, or even at least 20% by weight tackifying agent.

In other embodiments, the sealant composition passes the 140° F. creep resistance test method. In some embodiments, the sealant composition passes the ASTM D3111 test method. In one embodiment, the sealant composition exhibits less than 50% adhesive failure to glass after conditioning according to the one week water soak. In other embodiments, the sealant composition exhibits less than 50% adhesive failure to glass after conditioning according to the one week precondition.

In another embodiment, the sealant composition exhibits a modulus of at least 20 psi at 23° C. In other embodiments, the sealant composition exhibits a lap shear strength of at least 50 psi after 12 weeks at 23° C.

In other embodiments, the sealant composition exhibits a final hardness of from 35 Shore A to 70 Shore A. In one embodiment, the sealant composition exhibits a hardness of from about 35 Shore A to about 60 Shore A.

In another embodiment, the moisture curable sealant composition includes silane functional poly-α-olefin polymer, thermoplastic polymer, and greater than 30% by weight tackifying agent.

In another aspect, the invention features a multipane insulating glass assembly that includes a first glass pane, a second glass pane, a spacer, and a sealant composition disclosed herein, the first glass pane and second glass pane being bonded to the spacer through the sealant composition. In one embodiment, insulating glass assembly passes the ASTM E774/773 Class C performance requirement, passes ASTM E774/773 Class CB performance requirement, or even passes ASTM E774/773 Class CBA performance requirement.

In one embodiment, the insulating glass assembly incudes an insulating glass unit that includes a) a first glass pane, b) a second glass pane, c) a spacer, and d) a sealant composition, said first glass pane being bonded to a first surface of said spacer through said sealant composition, said second glass pane being bonded to a second surface of said spacer through said sealant composition, a frame, and a second sealant composition, the insulating glass unit being bonded to the frame through the second sealant composition, the second sealant composition including the reaction product of a silane functional poly-α-olefin polymer, thermoplastic elastomer, and tackifying agent.

The invention features a one part moisture curable sealant composition that exhibits good green strength and handling properties, and can maintain a bond to a glass substrate at low temperatures. The composition also can be applied using standard hot melt applicator equipment.

The sealant composition exhibits minimal stringing and good handling, i.e., is at least substantially free of transfer.

The cured sealant composition exhibits good resistance to solvents, good performance after accelerated aging, good heat resistance and good cold temperature performance.

Other features and advantages will be apparent from the following description of the preferred embodiments and from the claims.

DETAILED DESCRIPTION

The moisture curable hot melt sealant composition includes silane functional poly-α-olefin, a thermoplastic component selected from a thermoplastic elastomer, a thermoplastic polymer and combinations thereof, and a tackifying agent. The sealant composition cures upon exposure to atmospheric moisture to a composition that exhibits a tensile strength of at least 20 psi at 23° C., or even at least 70 psi at 23° C.

Prior to cure, the composition exhibits a viscosity of from about 10,000 centipoise (cps) to about 500,000 cps, or even from about 100,000 cps to about 400,000 cps, at 150° C.

The sealant composition can be applied to a substrate at a temperature from about 60° C. to about 120° C. and exhibits an initial green strength (i.e., initial lap shear) of at least about 2 psi, or even at least 4 psi, at 60° C.

The sealant composition is suitable for use as a secondary sealant in insulating glass assemblies, as well as a primary sealant. Preferably the sealant composition exhibits a final lap shear strength of at least 30 psi, or even at least 120 psi, after 12 weeks at 23° C. and 50% relative humidity. The cured sealant composition preferably exhibits hardness of from about 20 to about 75 Shore A, or even from about 35 to about 60 Shore A.

The sealant composition also is capable of providing a vapor barrier. Preferably the sealant composition exhibits a moisture vapor transmission rate (MVTR) no greater than 6 g/m$^2$/day, or even no greater than 2 g/m$^2$/day, when in the form of a 60 mil film.

The sealant composition preferably passes ASTM D3111 at 0° F., at −20° F., or even at −40° F. The sealant composition preferably passes the 140° F. Creep Resistance test method.

The sealant composition also preferably exhibits less than 50% adhesive failure, less than 10% adhesive failure, or even less than 5% adhesive failure to glass after conditioning according to the one week water soak, the one week water soak, or the one week precondition.

Particularly useful silane functional poly-α-olefins are either completely amorphous or have a low level of crystallinity. In one embodiment, the degree of crystallinity is no greater than 25% as determined by X-ray diffraction. Useful silane functional amorphous poly-α-olefins are derived from amorphous poly-α-olefin and a silane source. Useful amorphous poly-α-olefins include homopolymers, copolymers and terpolymers including, e.g., atactic polypropylene, atactic poly-1-butene and combinations thereof. The amorphous poly-α-olefins can be random or block copolymers. Other suitable amorphous poly-α-olefin polymers include, e.g., homogeneous substantially linear ethylene-α-olefin interpolymers of monomers including, e.g., propylene, 1-butene, 1-pentene, 3-metyl-1-butene, 1-hexene, 3-methyl-1-pentene, 4-methyl-1-pentene, 3-ethyl-1-pentene, 1-octene, 1-decene, and 1-undecene; amorphous copolymers with other olefins (e.g., ethylene, 1-butene, 1-pentene, 1-hexene, 4-methyl-1-pentene, 1-octene, and 1-decene) containing propylene as a main component, amorphous copolymers with other olefins (e.g., ethylene, propylene, 1-pentene, 1-hexene, 4-methyl-1-pentene, 1-octene, 1-decene and the like) containing 1-butene as a main component; and combinations thereof. Preferred olefin-based amorphous polymers include atactic polypropylene, propylene/ethylene amorphous copolymers, and propylene/1-butene amorphous copolymers.

One example of a useful class of amorphous poly-α-olefins include copolymers and terpolymers derived from 0% by weight to 95% by weight α-olefins having from 4 to 10 carbon atoms, (in other embodiments from 3% by weight to 95% by weight), from 5% by weight to 100% by weight propane (in other embodiments from 5% by weight to 97% by weight), and from 0% by weight to 20% by weight ethane as described, e.g., in U.S. Pat. No. 5,994,474.

In one embodiment, the silane to be grafted on the amorphous poly-α-olefin has two or three alkoxy groups attached directly to the silicon and at least one olefinic double bond containing moiety. Suitable examples include vinyltrimethoxysilane, vinyltriethoxysilane, vinyl tris(2-methoxyethoxy)silane, 3-methacryloxypropyltrimethoxysilane, 3-methacryloxypropyltriethoxysilane, vinyldimethylmethoxysilane and vinylmethyldibutoxysilane.

The amount silane for grafting on the amorphous poly-α-olefin is from about 0.1% by weight to about 10% by weight, from about 2% by weight to about 6% by weight, or even from about 3% by weight to about 5% by weight, based on the amorphous poly-α-olefin.

Any known method for grafting silane onto the amorphous poly-α-olefin can be used including, e.g., solution and melt (e.g., using an appropriate amount of a free-radical donor) methods. Useful methods of preparing silylated amorphous poly-α-olefin are described, e.g., in U.S. Pat. No. 5,994,474 and DE 40 00 695 and incorporated herein. Suitable examples of free-radical donors include diacyl peroxides such as dilauryl peroxide and didecanoyl peroxide, alkyl peresters such as tert-butyl peroxy-2-ethylhexanoate, perketals such as 1,1-di(tert-butylperoxy)-3,3,5-trimethylcyclohexane or 1,1-di(tert-butylperoxy)cyclohexane, dialkyl peroxides such as tert-butyl cumyl peroxide, di(tert-butyl) peroxide and dicumyl peroxide, C-radical donors including, e.g., 3,4-dimethyl-3,4-diphenylhexane and 2,3-dimethyl-2,3-diphenylbutane, and azo compounds (e.g., 2,2'-azodi (2-acetoxypropane)).

Preferably the amorphous poly-α-olefin has a number average molecular weight (Mn) from about 7,000 to about 14,000, a weight average molecular weight (Mw) from about 35,000 to about 90,000 and a Z average molecular weight (Mz) from about 13,000 to about 33,000, and polydispersity (MWD) from about 4.9 to about 6.2

Preferred silane functional amorphous poly-α-olefins include the silane functional amorphous poly-α-olefins that are commercially available under the VESTOPLAST trade designation from DeGussa-Hüls, Germany including, e.g., VESTOPLAST 206V silane functional amorphous poly-α-olefins.

The silane functional poly-α-olefin is present in the composition in an amount of from about 5% by weight to about 80% by weight, from about 15% by weight to about 50% by weight, or even from about 25% by weight to about 40% by weight.

Useful thermoplastic elastomers include, e.g., polyisobutylene, butyl rubber, ethylene/propylene/diene rubber (i.e., EPDM rubber), and combinations thereof. Other suitable thermoplastic elastomers include, e.g., polyetheramide block copolymers, polyesters, butadiene-styrene elastomers including, e.g., A-B, A-B-A, A-(B-A)n-B, (A-B)n-Y, and radial block copolymers and grafted versions thereof where the A block(s) is a polyvinyl aromatic block (e.g., styrene), and the B block is a rubbery midblock (e.g., isoprene, butadiene, ethylene-butylene, and ethylene-propylene) (e.g., styrene-butadiene-styrene block copolymers, styrene-isoprene-styrene block copolymers, styrene-ethylene-butylene-styrene block copolymers, styrene-ethylene-propylene-styrene block copolymers), polyurethane elastomers, polyolefin elastomers, elastomeric ethylene vinyl acetate, and mixtures thereof.

Useful commercially available thermoplastic elastomers include, e.g., polyisobutylenes available under the OPPANOL series of trade designations including B50, B80, B100, B 150, B200, B246, B12 and B15 trade designation from BASF (Germany) polyisobutylenes available under the VISTANEX series of trade designations from ExxonMobil including VISTANEX LMMS, MML-80, MML-100, MML-120, and MML 140, isobutylene-isoprene copolymers available the BUTYL Rubber series of trade designations including BUTYL 268 and BUTYL 065 from ExxonMobil Chemical Co. (Houston, Tex.); ethylene-propylene copolymers available under the VISTALON series of trade designations including, e.g., VISTALON 404, from Exxon Chemical Co.; styrene-ethylene/butylene-styrene block copolymers available under the KRATON G series of trade designations including, e.g., KRATON G-1652 and G-1657, from Kraton Polymers (Houston, Tex.); styrene-butadiene-styrene and styrene-isoprene-styrene block copolymers available under the KRATON D series of trade designations including, e.g., KRATON D-1111 and D-1112 from Kraton Polymers; silane terminated block copolymers available under the KRATON SKFG11 trade designation from Kraton Polymers; and styrene-butadiene-styrene and styrene-isoprene-styrene block copolymers available under the VECTOR series of trade designations including, e.g., VECTOR 4112, 4114 and 4411 from Dexco Polymers (Houston, Tex.).

Preferably the thermoplastic component includes thermoplastic elastomer in an amount of at least 10% by weight, from about 10% by weight to about 60% by weight, or even about 20% by weight to about 40% by weight.

Useful thermoplastic polymers include polyalkylenes (e.g., polyethylene, polypropylene and polybutylene), poly(alpha)olefins including, e.g., homo-, co- and terpolymers of aliphatic mono-1-olefins (alpha olefins) (e.g., poly(alpha)olefins containing from 2 to 10 carbon atoms), homogeneous linear or substantially linear interpolymers of ethylene having at least one $C_3$ to $C_{20}$ alphaolefin, polyisobutylenes, poly(alkylene oxides), poly(phenylenediamine terephthalamide), polyesters (e.g., polyethylene terephthalate), polyacrylates, polymethacrylates, polyacrylamides, polyacrylonitriles, copolymers of acrylonitrile and monomers including, e.g., butadiene, styrene, polymethyl pentene, and polyphenylene sulfide (e.g., styrene-acrylonitrile, acrylonitrile-butadiene-styrene, acrylonitrile-styrene-butadiene rubbers), polyimides, polyamides, copolymers of vinyl alcohol and ethylenically unsaturated monomers, polyvinyl acetate (e.g., ethylene vinyl acetate), polyvinyl alcohol, vinyl chloride homopolymers and copolymers (e.g., polyvinyl chloride), terpolymers of ethylene, carbon monoxide and acrylic acid ester or vinyl monomer, polysiloxanes, polyurethanes, polystyrene, and combinations thereof, and homopolymers, copolymers and terpolymers thereof, and mixtures thereof. Other useful classes of thermoplastic polymers include asphalts, bitumens, crude rubbers, fluorinated rubbers, and cellulosic resins.

Preferred thermoplastic polymers include ethylene vinyl acetate having a vinyl acetate content of from about 10% by weight to about 60% by weight and a melt index of from about 0.2 to 1000, or even a vinyl acetate content of from about 18% by weight to about 50% by weight and a melt index of from about 0.2 to 500.

Useful commercially available thermoplastic polymers include, e.g., atactic polypropylene polymers available under the REXTAC series of trade designations including, e.g., REXTAC RT 2535 and RT 2585, from Rexene Products Co. (Dallas, Tex.) and the EASTOFLEX series of trade designations including, e.g., EASTOFLEX E1060, from Eastman Chemical Co. (Kingsport, Tenn.); polyethylene polymers available under the EPOLENE C series of trade designations from Eastman Chemical Co.; ethylene vinyl acetate copolymers available under the ATEVA series of trade designations from AT Plastics (Brampton, Ontario, Canada) including ATEVA 4030MC and ATEVA 1850, the ELVAX series of trade designations from DuPont de Nemours (Wilmington, Del.) and the ULTRATHENE series of trade designations from Millennium Petrochemicals (Rolling Meadows, Ill.); ethylene methyl acrylate copolymers available under the OPTEMA series of trade designations from Exxon Chemical Co. (Houston, Tex.); ethylene n-butyl acrylate copolymers available under the LOTRYL series of trade designations from Elf Atochem North America (Philadelphia, Pa.), the ESCORENE series of trade designations from Exxon Chemical Co. and the ENATHENE series of trade designations from Millennium Petrochemicals; ethylene n-butyl acrylate carbon monoxide terpolymers available under the ELVALOY series of trade designations from DuPont; thermoplastic polyurethane polymers available under the PEARLSTICK series of trade designations from Aries Technologies (Derry, N.H. a distributor for Merquinsa, Barcelona, Spain); butylene/poly(alkylene ether) phthalate polymers available under the HYTREL series of trade designations from DuPont; ethylene acrylate copolymers also available under the ELVALOY series of trade designations from DuPont; and acrylic polymers available under the ELVACITE series of trade designations from ICI Acrylics (St. Louis, Mo.).

Useful commercially available homogeneous linear or substantially linear interpolymers of ethylene having at least one $C_3$ to $C_{20}$ alphaolefin and a polydispersity less than about 2.5 include, e.g., EXACT 5008 ethylene-butene copolymer, EXXPOL SLP-0394 ethylene-propylene copolymer, and EXACT 3031 an ethylene-hexene copolymer from Exxon Chemical Co. (Houston, Tex.) and ethylene/1-octene polymers available under the trade designations AFFINITY, INSITE and ENGAGE from Dow Chemical Co. (Midland, Mich.).

The thermoplastic component is preferably present in the composition in an amount of from about 10% by weight to about 75% by weight, from about 20% by weight to about 70% by weight, or even from about 40% by weight to about 60% by weight.

Preferred tackifying agents have a ring and ball softening point of from about 50° C. to about 150° C., in other embodiments from about 80° C. to about 120° C. The tackifying agent preferably is free of groups with which the silanol group of the silyated amorphous poly-α-olefin will react. Examples of suitable tackifying agents include aliphatic, cycloaliphatic, aromatic, aliphatic-aromatic, aromatic modified alicyclic, and alicyclic hydrocarbon resins and modified versions and hydrogenated derivatives thereof; terpenes (polyterpenes), modified terpenes (e.g., phenolic modified terpene resins), hydrogenated derivatives thereof and mixtures thereof; alpha methyl styrene resins and hydrogenated derivatives thereof; and combinations thereof. Other useful tackifying agents are disclosed in, e.g., U.S. Pat. No. 6,355,317, and incorporated herein.

Other tackifying agents include natural and modified rosins such as gum rosin, wood rosin, tall oil rosin, distilled rosin, completely or partially hydrogenated rosin, dimerized rosin and polymerized rosin; rosin esters including, e.g., glycerol and pentaerythritol esters of natural and modified rosins, (e.g., glycerol esters of pale, wood rosin, glycerol esters of hydrogenated rosin, glycerol esters of polymerized rosin, pentaerythritol esters of hydrogenated rosin and phenolic-modified pentaerythritol esters of rosin); alpha methyl styrene resins and hydrogenated derivatives thereof; low molecular weight polylactic acid; and combinations thereof.

Suitable commercially available tackifying agents include, e.g., partially hydrogenated cycloaliphatic petroleum hydrocarbon resins available under the EASTOTAC series of trade designations including, e.g., EASTOTAC H-100, H-115, H-130 and H-142 from Eastman Chemical Co. (Kingsport, Tenn.) available in grades E, R, L and W, which have differing levels of hydrogenation from least hydrogenated (E) to most hydrogenated (W), the ESCOREZ series of trade designations including, e.g., ESCOREZ 1310, ESCOREZ 5300 and ESCOREZ 5400 from Exxon Chemical Co. (Houston, Tex.), and the HERCOLITE 2100 trade designation from Hercules (Wilmington, Del.); partially hydrogenated aromatic modified petroleum hydrocarbon resins available under the ESCOREZ 5600 trade designation from Exxon Chemical Co.; aliphatic-aromatic petroleum hydrocarbon resins available under the WINGTACK EXTRA trade designation from Goodyear Chemical Co. (Akron, Ohio); styrenated terpene resins made from d-limonene available under the ZONATAC 105 LITE trade designation from Arizona Chemical Co. (Panama City, Fla.); aromatic hydrogenated hydrocarbon resins available under the REGALREZ 1094 trade designation from Hercules; and alphamethyl styrene resins available under the trade designations KRISTALEX 3070, 3085 and 3100, which have softening points of 70° C., 85° C. and 100° C., respectively, from Hercules.

The tackifying agent is preferably present in the composition in an amount of from about 5% by weight to about 60% by weight, from about 15% by weight to about 50% by weight, or even from about 20% by weight to about 40% by weight.

The composition can also include a silane-containing coupling agent, which is also referred to as a "silane adhesion promoter." Examples of silane-containing coupling agents include 3-glycidyloxypropyl trialkoxysilane, 3-acryloxypropyl trialkoxysilane, 3-amino-propyl tri alkoxysi lane, vinyl trialkoxyl silane, N-aminoethyl-3-aminopropyl methyl dialkoxysilane, phanylaminopropyl trialkoxysilane, aminoalkyl trialkoxydisilane, aminoalkyl i-butyl methoxysilane, and combinations thereof.

Useful commercially available silane coupling agents include, e.g., isocyanurate trimethoxy silanes available under the SILQUEST series of trade designations including, e.g., SILQUEST Y-11597, SILQUEST A-1170, SILQUEST A-1110, SILQUEST Y-9669 and SILQUEST A-15 from OSi Specialties-Crompton Corp. (Greenwich, Conn.), under the DYNASYLAN series of trade designations including, e.g., DYNASYLAN 1189 N-(n-butyl)aminopropyltrimethoxysilane and DYNASYLAN MTMO 3-mercaptopropyl trimethoxy silane both of which are available from Degussa Corporation (Naperville, Ill.), under the A-189 gamma-mercaptopropyltrimethoxysilane trade designation from OSi Specialties-Crompton Corp., and tris(3-trimethoxysilylpropyl) iso-cyanurate from Gelest, Inc. (Morrisville, Pa.)

The silane coupling agent is preferably present in the composition in an amount of from about 0% by weight to about 5% by weight, from about 0.2% by weight to about 2% by weight, or even from about 0.4% by weight to about 1% by weight.

The composition can also include other additives including, e.g., fillers, waxes, plasticizers thermal stabilizers, light stabilizers (e.g., UV light stabilizers and absorbers), optical brighteners, antistats, lubricants, antioxidants, catalysts, rheology modifiers, biocides, corrosion inhibitors, dehydrators, organic solvents, colorants (e.g., pigments and dyes), surfactants antiblocking agents, nucleating agents, flame retardants and combinations thereof. The type and amount of other additives is selected to minimize the present of moisture that can prematurely initiate cure of the sealant.

Suitable fillers include, e.g., fumed silica, precipitated silica, talc, calcium carbonates, carbon black, aluminasilicates, clay, zeolites, ceramics, mica, titanium dioxide, and combinations thereof. The composition can include filler in an amount of from 0% by weight to about 40% by weight, from about 10% by weight to about 35% by weight, or even from about 20% by weight to about 30% by weight.

Preferred plasticizers include paraffinic oils, naphthenic oils, low molecular weight poly-1-butene, low molecular weight polyisobutene, and combinations thereof.

A crosslinking accelerator can be added to the composition to increase the rate of crosslinking. Useful crosslinking accelerators include, e.g., organotin compounds including, e.g., dialkyl tin dicarboxylates (e.g., dibutyl tin dilaurate and dibutyl tin diacetate), tin carboxylates, tertiary amines, stannous salts of carboxylic acids, e.g., stannous octoate and stannous acetate, tetrabutyl dioleatodistannoxane, titanium compounds, organosilicon titanates, alkyltitantates, and metal alkoxides (e.g., aluminum isopropoxide and zirconium isopropoxide), and combinations thereof. The accelerator can be added either in pure form or, for greater ease of metering, in the form of a master batch that includes the amorphous poly-β-olefin. The accelerator can be added to the composition before melting, in the form of a dry mix, or after melting. Accelerator preferably is present in amounts from 0.001% by weight to 20% by weight, or even from 0.01% by weight to 5% by weight.

The sealant preferably is applied in the form of a melt at temperatures from about 50° C. to about 150° C., from about 65° C. to about 130° C., or even from about 75° C. to about 115° C. The sealant can be applied using a wide variety of application techniques including, e.g., linear extruder, hand gun, other forms of extruder beads, and combinations thereof. The substrates are subsequently joined within the open time of the applied composition, the duration of which depends on the composition of the applied mixture.

The sealant composition is particularly useful for bonding glass to various substrates including other glass substrates, polymer substrates, metallic substrates, and combinations thereof, and providing a moisture barrier function in a variety of applications and constructions. The hot melt moisture curable sealant is particularly useful in constructions including, e.g., insulating glass units, sash frame assemblies, automotive and moulding applications, windows, doors, walls, and constructions that require good adhesion to glass, metal, plastic and combinations thereof.

Insulating glass assemblies usually include a spacer having at least two glazing surfaces, a sealant composition, and at least two panes of glass bonded to the spacer through the sealant composition to enclose a sealed air chamber. The assembly can include a desiccant positioned in the sealed chamber. The spacer can include a channel, e.g., a U-shaped channel, in which the desiccant is disposed. The spacer can be constructed such that it extends from the frame and is integral with the frame. In other embodiments, the spacer can be a separate structure that is used to form an insulating glass unit, which is then further processed by bonding the insulating glass unit to a sash frame. Examples of integrated multipane window units, insulating glass units, and sash assemblies are described in U.S. Pat. No. 5,177,916 (Misera et al.), U.S. Pat. No. 6,286,288 (France), U.S. Pat. Nos. 5,873,203, 5,653,073 (Palmer), U.S. Pat. No. 6,055,783 (Guhl et al.), and U.S. Pat. No. 6,401,428 (Glover et al.), and PCT Publication No. WO 99/14169 (Guhl et al.) and WO 98/25001 (France), and incorporated herein. The spacer can be of a variety of compositions including, e.g., wood, metal, plastic (e.g., polyvinyl chloride), composites (e.g., polymer and wood fiber composites) and combinations thereof.

An example of a useful method of making an insulating glass assembly is described in copending United States patent application Ser. No. 60/453,872, filed Mar. 11, 2003, and entitled, "Sealant Compositions For Forming Adhesive Bonds To Glass At Low Temperature," and incorporated herein.

Desiccant can be provided in many forms and can be disposed in a channel of an insulating glass assembly, on the surface of a spacer of an insulating glass assembly, and combinations thereof. Useful desiccating matrix compositions and constructions disclosed, e.g., in U.S. Pat. No. 5,510,416 (Meyer et al.), U.S. Pat. No. 5,632,122 (Spinks), U.S. Pat. Nos. 5,503,884, 5,436,040 (Lafond) and U.S. Pat. No. 5,177,916 (Misera et al.).

The sealant composition can be used in the construction of insulating glass assemblies that, when tested according to ASTM E774-88 entitled, "Standard Specification for Sealed Insulating Glass Units," in conjunction with ASTM E773-97 entitled, "Standard Test Method for Accelerated Weathering of Sealed Insulating Glass Units," hereinafter referred to as "ASTM E774/773," pass the Class C performance requirements, Class B performance requirements, or even Class A performance requirements. The sealant can be used in the construction of insulating glass assemblies that, when tested according to ASTM E1887-97 entitled, "Standard Test Method for Fog Determination," are free of visible fog.

The sealant composition can also be used to bond an insulating glass assembly, e.g., an insulating glass unit, to a frame. This process is often referred to as "back bedding." Back bedding is discussed in, e.g., U.S. Pat. Nos. 6,286,288 and 5,856,404.

The invention will now be described by way of the following examples. The amounts specified are in grams unless otherwise specified.

EXAMPLES

Test Procedures

Test procedures used in the examples include the following.

Tensile Strength, Modulus at 100% Elongation and Elongation Test Method

The tensile strength at break, modulus at 100% elongation and % elongation of a sealant composition is determined according to ASTM-D638-00 entitled, "Standard Test Method for Tensile Properties of Plastics."

A homogeneous film of the sealant composition is pressed at 100° C. to a thickness of from 40 mil to 60 mil. The film is conditioned at 23° C. and 50% relative humidity for 12 weeks to cure. Specimens are cut from the film and tested for tensile strength at 25%, 50% and 100% elongation, modulus at 100% elongation and elongation according to ASTM D638-00.

Lap Shear Strength

The lap shear strength is determined according to ASTM C-961-01 entitled, "Standard Test Method for Lap Shear Strength of Hot Applied Sealants," with the exception that the test specimen is prepared as follows. A 1 in×1 in film of sealant composition having a thickness of from 50 mil to 60 mil is placed on a 4 in×1 in piece of aluminum. A 1 in×3 in piece of glass is then placed on top of the film and pressed hard against the film using maximum hand pressure. The test specimen is then heated at 120° C. for 10 minutes.

Initial lap shear (i.e., green strength) is measured within about one to two minutes after preparing the bond sample.

Final lap shear is measured 12 weeks after preparing the bond sample.

Viscosity

Viscosity is measured using a Brookfield Thermosel Viscometer attached to a chart recorder using an S-29 spindle at 1 rotation per minute at a sample temperature of 300° F. (148.9° C.).

Permeability Coefficient (MVTR)

The permeability coefficient (MVTR) is determined according to ASTM F1249-90 entitled, "Standard Test Method for Water Vapor Transmission Rate Though Plastic Film and Sheeting using a Modulated Infrared Sensor." The test is conducted at approximately 37° C. (100° F.) and 90% relative humidity on a film of sample having a thickness of 60 mils.

Hardness

The hardness of the sealant composition is measured using a Shore A durometer according to ASTM D-2240, which is incorporated herein.

Cold Temperature Flexibility Test

Flexibility is measured according to ASTM D3111 entitled, "Flexibility Determination of Hot Melt Adhesive by Mandrel Bend Test Method" (which is incorporated herein) using a free film.

Glass Bond Adhesion Test

Test specimens were prepared by placing a 2 in×1.5 in spacer between two 1 in×3 in pieces of glass in a jig. The screws on the jig are tightened such that the pieces of glass are pressing against the spacer to form a sample receiving channel. Multiple spacers and multiple pieces of glass can be used to form multiple sample receiving channels.

A metal spatula is used to trowel sealant into the channel to fill the channel. The jig is then placed on a flat nonflammable surface, which is then placed in an oven that has been preheated to a temperature sufficient to allow the sealant to wet the glass (i.e., from 120° C. to 140° C.). The jig including the test specimen is stored in the oven for 10 minutes while maintaining the oven temperature at the elevated temperature (i.e., from 120° C. to 140° C.). The jig is then removed from the oven and cooled. The test specimen is then removed from the jig and cooled overnight.

Conditioning

One Week Room Temperature: The test specimen prepared according to the glass bond adhesion test is stored at room temperature and about 50% relative humidity for one week prior to testing.

One Week Water Soak: The test specimen prepared according to the glass bond adhesion test is placed in deionized water at room temperature for one week and then removed and dried prior to testing.

One Week Precondition: The test specimen prepared according to the glass bond adhesion test is conditioned at 60° C. and 100% relative humidity for one week prior to testing.

After conditioning, the test specimens are observed to determine the % adhesion failure to glass for each bond under each condition. The average % adhesion failure is reported.

140° F. Creep Resistance

Creep resistance was determined as follows. A 1 in×1 in film of sealant composition having a thickness of from 50 mil to 60 mil is placed on a 4 in×1 in piece of aluminum. A 1 in×3 in piece of glass is then placed on top of the film and pressed hard against the film using maximum hand pressure. The test specimen is then heated at 120° C. for 10 minutes. The test specimen is allowed to cure for at least 4 weeks.

Then a one pound load is hung from an end of the test specimen and placed in an oven at 140° F. The time to failure is recorded. The test specimen is recorded as a pass if there is no failure after seven days.

Example 1

The sealant composition of Example 1 was prepared by sequentially charging the following components into a sigma blade mixer that had been preheated to 120° C. equipped with a vacuum pump at low speed mixing: 160 g BUTYL 065 butyl rubber (ExxonMobil Chemical Co., Houston, Tex.) and 80 g OPPANOL B12 polyisobutylene (BASF, Germany). The composition was mixed for 20 minutes and then 167.84 g ATEVA 4030MC ethylene vinyl acetate (AT Plastics, Ontario, Canada) was added and mixed for 10 minutes. 176 g ESCOREZ 1310LC resin (ExxonMobil Chemical Co., Houston, Tex.) was then added to the mixer and mixed at low speed for 10 minutes. 16 g dispersion of gray pigment in ethylene vinyl acetate (Clariant, Charlotte, N.C.) was then added with mixing at low speed, a vacuum was turned on and mixing continued for 30 minutes. 250 g VESTOPLAST 206V silanated amorphous poly-α-olefin (Degussa-Hüls, Germany) was then charged to the reaction mixture with mixing at low speed an under vacuum for 30 minutes, which was followed by the addition of 0.16 g dibutyl tin diluarate with mixing at low speed under vacuum for 15 minutes.

Examples 2-4

The sealant compositions of Examples 2 and 3 were prepared according to the method of Example 1 with the exception that the components and the amounts thereof were as set forth in Table 1. The compositions of Examples 2-3 were tested according to the initial lap shear, final lap shear, initial hardness, final hardness and adhesion failure test methods set forth above. The results are reported in Table 1. The compositions of Examples 2-3 were tested according to the Accelerated Aging test method and passed.

The sealant composition of Example 4 is prepared according to the method of Example 1 with the exception that the components and the amounts thereof are as set forth in Table 1. The composition of Example 4, when tested according to the initial lap shear, final lap shear, initial hardness, final hardness and adhesion failure test methods set forth above, is expected to exhibit the results reported in Table 1. The composition of Example 4, when tested according to the Accelerated Aging test method, is expected to pass.

TABLE 1

| | Component | | |
|---|---|---|---|
| | 2 | 3 | 4 |
| VESTOPLAST 206V | 250 | 250 | 250 |
| Butyl Rubber | 160 | 160 | 80 |
| OPPANOL B12 | 80 | 0 | 0 |
| VISTANEX LMMS[1] | 0 | 0 | 0 |
| ATEVA 4030 | 160 | 240 | 0 |
| ATEVA 1850[2] | 0 | 0 | 0 |
| ESCOREZ 1310 | 176 | 176 | 320 |
| HUBERCARB Q325[3] | 0 | 0 | 184 |
| Calcium Oxide | 0 | 0 | 2 |
| Grey Pigment Dispersion | 16 | 16 | 16 |
| SILQUEST Y11597[4] | 0 | 4 | 0 |
| Dibutyltin Dilaurate | 0.16 | 0.16 | 0.1 |
| Initial Lap Shear (psi) | 40 | NT [[70]] | NT [[80]] |
| Lap shear after 24 hours (psi) | NT | 70 | 80 |
| Initial Shore A | 32 | 35 | 50 |
| Final Shore A | 40 | 45 | 53 |
| ASTM D3111 at 0° F. | Pass | Pass | NT |
| ASTM D3111 at −20° F. | Pass | Pass | NT |
| ASTM D3111 at −40° F. | Pass | Pass | NT |
| Creep Resistance | Pass | Pass | Pass |
| % Adhesion Failure | | | |
| 1 week at room temp | 0 | 1 | 0 |
| 1 week water soak | 0 | 2 | 0 |
| 1 week precondition | 0 | 0 | 0 |

[1]VISTANEX LMMS polyisobutylene (ExxonMobil Chemical Co.)
[2]ATEVA 1850 ethylene vinyl acetate copolymer (AT Plastics)
[3]HUBERCARB Q325 calcium carbonate (J. M. Huber Corp., Engineered Materials Division, Fairmont, Georgia)
[4]SILQUEST Y11597 isocyanurate trimethoxy silane (OSi Specialties-Crompton Corp., Greenwich, Connecticut)
NT = not tested The relevant portions of all documents disclosed herein are hereby incorporated by reference in their entirety. Other embodiments are within the claims.

What is claimed is:

1. A moisture curable sealant composition comprising:
   silane functional poly-α-olefin polymer;
   thermoplastic elastomer comprising a silane terminated block copolymer; and
   tackifying agent.

2. A moisture curable sealant composition comprising:
   silane functional poly-α-olefin polymer;
   thermoplastic elastomer;
   tackifying agent; and
   poly-1-butene,
   the thermoplastic elastomer comprising
      a block copolymer selected from the group consisting of styrene-ethylene-butylene-styrene, styrene-ethylene-propylene-styrene, and combinations thereof,
      an ethylene-propylene copolymer, or
      a combination thereof.

3. The moisture curable sealant composition of claim 2, wherein the tackifying agent comprises a hydrogenated tackifying agent.

4. The composition of claim 2, wherein the composition comprises from about 10% by weight to about 60% by weight block copolymer selected from the group consisting of styrene-ethylene-butylene-styrene, styrene-ethylene-propylene-styrene, and combinations thereof.

5. The composition of claim 2, further comprising a thermoplastic polymer comprising at least one of ethylene-butene copolymer, ethylene-propylene copolymer, ethylene-hexene copolymer, and ethylene-1-octene copolymer.

6. The composition of claim 2, wherein the composition comprises from about 10% by weight to about 40% by weight of the thermoplastic elastomer.

7. A moisture curable sealant composition comprising:
   silane functional poly-α-olefin polymer;
   thermoplastic elastomer;
   tackifying agent; and
   ethylene vinyl acetate.

8. The sealant composition of claim 7 comprising
   from about 5% by weight to about 80% by weight of the silane functional poly-α-olefin polymer,
   from at least 10% by weight to about 75% by weight of the thermoplastic elastomer, and
   from at least 5% by weight to about 60% by weight of the tackifying agent.

* * * * *